United States Patent
Hildebrand (10) Patent No.: US 7,080,118 B2
(45) Date of Patent: Jul. 18, 2006

(54) SYSTEM AND METHOD FOR DYNAMICALLY DISPLAYING HTML FORM ELEMENTS

(75) Inventor: Dean M. Hildebrand, Toronto (CA)

(73) Assignee: International Business Machines Corporation, Armonk, NY (US)

(*) Notice: Subject to any disclaimer, the term of this patent is extended or adjusted under 35 U.S.C. 154(b) by 547 days.

(21) Appl. No.: 09/994,973

(22) Filed: Nov. 27, 2001

(65) Prior Publication Data
US 2003/0023674 A1    Jan. 30, 2003

(30) Foreign Application Priority Data
Nov. 30, 2000 (CA) .................................... 2327159

(51) Int. Cl.
G06F 15/16 (2006.01)
(52) U.S. Cl. ..................... 709/203; 709/250; 709/217
(58) Field of Classification Search ................ 709/203, 709/223, 250, 217
See application file for complete search history.

(56) References Cited

U.S. PATENT DOCUMENTS

| | | |
|---|---|---|
| 5,968,119 A | 10/1999 | Stedman et al. |
| 6,064,977 A | 5/2000 | Haverstock et al. |
| 6,345,278 B1 * | 2/2002 | Hitchcock et al. .......... 707/100 |

FOREIGN PATENT DOCUMENTS

| | | |
|---|---|---|
| JP | 2000-298646 | 10/2000 |
| WO | WO 00 57299 | 9/2000 |

* cited by examiner

Primary Examiner—Zarni Maung
Assistant Examiner—Nghi Tran
(74) Attorney, Agent, or Firm—Alison D. Mortinger (57) ABSTRACT

A method of selectively displaying a markup language form element on a Web page when an associated object is available to a Web server, the method comprising associating the markup language form element with the object, determining whether the object is available to the Web server; generating a markup language document that includes the markup language form element if the object is available to the Web server, and displaying the markup language form element if the markup language document contains the markup language form element.

34 Claims, 8 Drawing Sheets

SYSTEM AND METHOD FOR DYNAMICALLY DISPLAYING HTML FORM ELEMENTS

FIELD OF THE INVENTION

The present invention relates generally to client-server based computer networks, and more particularly to a system and method for dynamically providing content to the client.

BACKGROUND OF THE INVENTION

The Internet is a system of geographically distributed computer networks interconnected by computers executing networking protocols that allow users to interact and share information over the networks. More specifically, the World-Wide-Web ("WWW") is a collection of Web servers which support documents formatted as so called "Web pages" for viewing by Web clients. The WWW communications paradigm is based on a conventional client-server model and is facilitated by the use of Web servers which support Internet and Web protocols (e.g. TCP/IP and Hypertext Transfer Protocol ("HTTP")).

Web clients can request Web page documents from a Web server which are then served to the Web clients over the WWW. A Web page is a computer data file on a host operating a Web server. The Web page may comprise a single line or multiple pages of information and may include any message, name, word, sound, picture, or combination of these elements. Users commonly view Web pages using tools known as Web browsers, which are software programs that are installed on the Web client and which allow users to access and search the Internet. Web browsers may be graphical (such as Netscape Corporation's Navigator™ or Microsoft Corporation's Internet Explorer™) or text based (such as Gopher). In a Web browser, information is displayed along with hypertext links which identify other WWW sites.

Web pages are created using a standard coding language called, Hypertext Markup Language ("HTML"). HTML along with Extended Markup Language ("XML") and others are members of a family of computer languages referred to as "markup languages". Markup languages are computer languages which define the format of a text document in a device-independent way. A primary purpose of a markup language, such as HTML, is to instruct a Web browser how to display the contents of the document, including text, images and other support media.

An HTML document contains textual tags indicating a format to be applied or other action to be taken relative to document text. These tags are character strings that have defined meanings in the particular markup language being used. Accordingly, HTML is a collection of platform-independent tags, which define the various components of the Web page. HTML documents are generally static, that is, the contents do not change over time except when the document is manually modified. Accordingly, in order to provide different HTML documents, it is necessary to install a server-side program that can generate an HTML document. HTML forms are comprised of one or more text input boxes, clickable buttons, multiple choice check boxes, and pull down menus and image maps. One or more HTML form can be included in an HTML document. Each HTML form can contain the same content as a HTML document, including text and images.

Typically, a Web server administrator is sold a "suite" of server application programs (e.g. IBM's Websphere™ Commerce Suite Version 4.1) from which certain application programs can be specifically selected for installation on the Web server. Once these server application programs are installed, they can be used to enhance the functionality of the Web site hosted by Web server. Access to these server application programs can be provided to the use through the use of HTML form elements such as buttons or scroll-down menus displayed by the Web browser.

The Web server administrator is also provided with a standard Web server program (typically in Java) which generates an HTML document that provides Web clients with interactive access to the various server application programs that are installed on a Web server. If a Web server administrator decides to install or de-install a particular server application program on the Web server then they will want to either provide or remove an associated HTML form element (e.g. application enabling button) from the Web page that is displayed to the user. In order to do so, it is generally necessary for the Web server administrator to modify the Web server program in order to provide an appropriate HTML document to the Web client. This type of program file maintenance is extremely cumbersome and time consuming especially when there are a large number of server applications that are routinely installed and de-installed on a Web server.

Accordingly, there is a need for a system and method which allows for the selective display of an HTML form element on a Web page at a Web client depending on whether an associated server application program is installed on a Web server.

SUMMARY OF THE INVENTION

It is therefore an object of the present invention in one aspect to provide a method of selectively displaying a markup language form element on a Web page when an object is available to a Web server, the method comprising the steps of:
 (a) associating the markup language form element with the object;
 (b) determining whether the object is available to the Web server;
 (c) generating a markup language document that includes the markup language form element if the object is available to the Web server; and
 (d) displaying the markup language form element on the Web page if the markup language document contains the markup language form element.

In another aspect the invention provides a computer system for selectively displaying a markup language form element on a Web page when an associated object is available to a Web server, said computer system comprising:
 (a) a server for generating a markup language document, said server comprising:
  (i) storage means for storing a value representing whether the object is available to the Web server;
  (ii) a first processing means coupled to said storage means for:
   (A) determining whether the object is available to the Web server;
   (B) generating a markup language document that includes the markup language form element if the object is available to the Web server;
 (b) a communications network coupled to said server; and
 (c) a second processing means coupled to said server through said communications network, said second processing means for reading and displaying the markup language document.

It will be appreciated by those skilled in the art that the invention can be embodied in a computer program which can be stored in storage or transmitted as a signal, such as on a modulated carrier signal for use in a computer system, or on a network such as the Internet for use in a computer system.

BRIEF DESCRIPTION OF THE DRAWINGS

For a better understanding of the present invention and to show more clearly how it may be carried into effect, reference will now be made, by way of example, to the accompanying drawings, which show a preferred embodiment of the present invention and in which.

DETAILED DESCRIPTION OF THE PREFERRED EMBODIMENT

Figure 1:
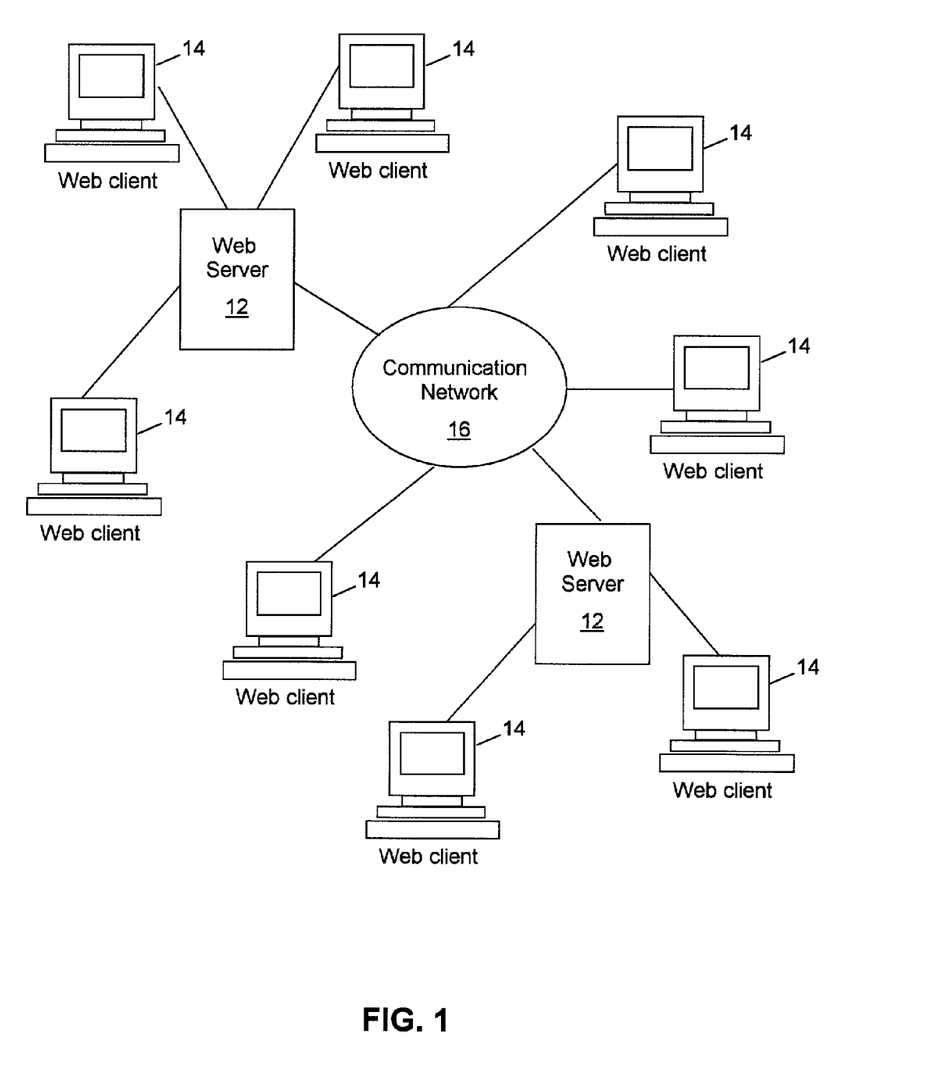
FIG. 1 is a block diagram of a computer network within which the present invention is implemented.

Reference is first made to FIG. 1 which shows a conceptual diagram of the well known Internet computer network 10 within which the present invention can be implemented. The Internet 10 is based on a client server model and comprises a large network of Web servers 12 which are accessible by a plurality of Web clients 14 over a communication network 16. The World-Wide-Web ("WWW") is a collection of Web servers 12 that utilize the hypertext transfer protocol ("HTTP"). HTTP is a known application protocol that provides users access to files (which can be in different formats such as text, graphics, images, sound, video, etc.) using a standard page description language or "markup language", such as Hypertext Markup Language ("HTML") or Extended Markup Language ("XML").

Figure 2:
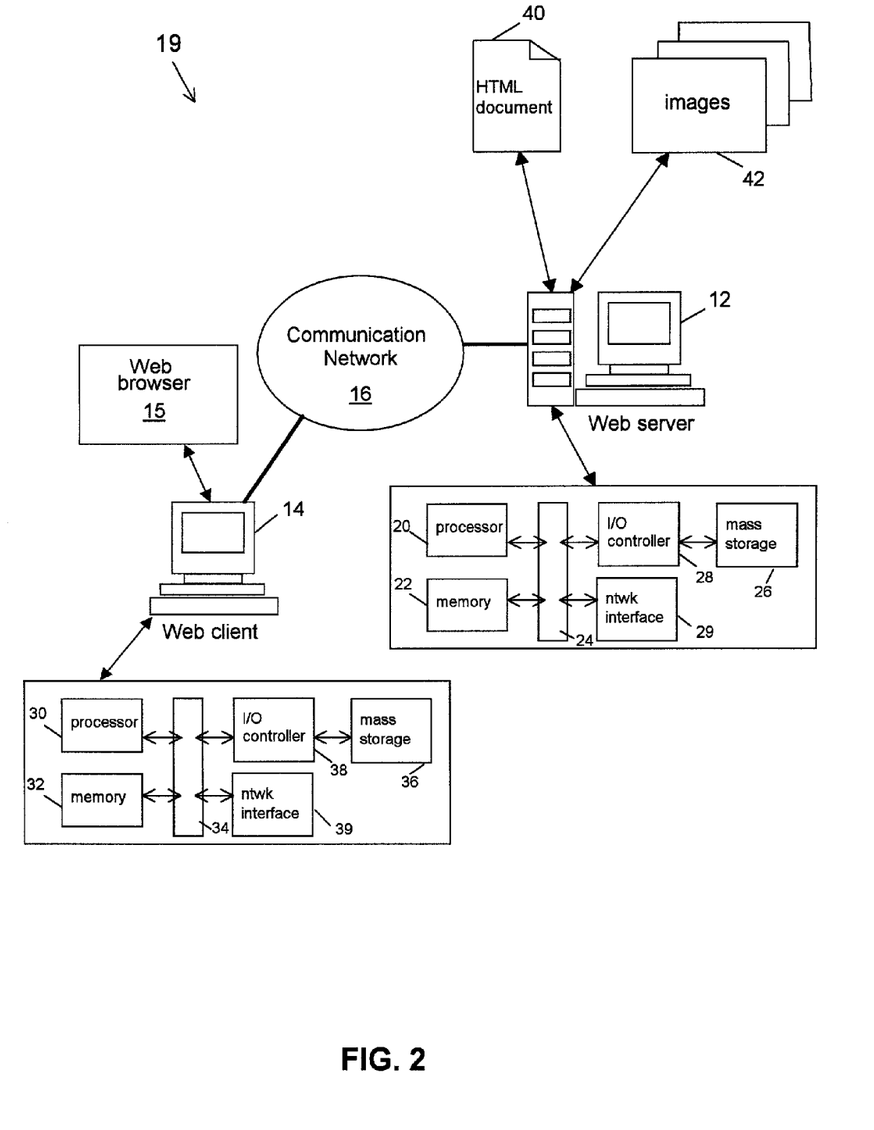
FIG. 2 is a schematic diagram of a Web server and a Web client of FIG. 1 illustrating the interaction between server and client.

FIG. 2 shows a computer system 19 comprising a Web server 12 and Web client 14 connected over communication network 16. The hardware components of Web server 12 and Web client 14 are shown in greater detail.

Web server 12 includes conventional components such as a processor 20, memory 22 (e.g. RAM), a bus 24 which couples the processor 20 and memory 22, a mass storage device 26 (e.g. a magnetic or optical disk) coupled to the processor 20 and memory 22 through an I/O controller 28 and a network interface 29, such as a conventional modem. Web server 12 typically comprises a server computer (e.g., a UNIX or Windows NT-based computer) connected to communication network 16 (e.g. the Internet, an intranet or other network) and on which is installed Web server software.

Web client 14 may be any personal computer of other computer that is capable of running a Web browser program 15 and includes conventional components such as a processor 30, memory 32 (e.g. RAM), a bus 34 which couples the processor 30 and memory 32, a mass storage device 36 (e.g. a magnetic hard disk or an optical storage disk) coupled to the processor 30 and memory through an I/O controller 38 and a network interface 39 (e.g. a conventional modem). The operating system of Web client 14 may be Windows, OS/2, or Linux. Memory 32 supports a number of internet access tools including a HTTP compliant Web browser 15 (e.g. Netscape™ Navigator by Netscape Communications of Mountain View, California or Internet Explorer™ by Microsoft Corporation of Redmond, Washington, etc.) As discussed, Web browser 15 is a software program that allows Web client 14 to communicate with Web server 12 to enable access to and viewing of HTML documents.

Web server 12 is a computer which is capable of running Web server software such as that provided by Netscape, Microsoft or Apache. Web server 12 operates a "Web site" which supports files in the forms of HTML documents and pages. The Web server software is configured with the host name of Web server 12 and the location of HTML documents stored by Web server 12 and those stored on other servers. The location of an HTML document 40 is defined by an address called a URL ("Uniform Resource Locator"). Web browser 15 uses a particular URL to find and fetch resources from the Internet and the WWW. In addition to HTML code, HTML document 40 can incorporate other information content 42, such as images, audio, video, executable programs, etc. (shown as "images" 42), which typically reside at Web server 12 but may reside on other computers connected to communication network 16. In the preferred embodiment, HTML document 40 and images 42 are stored as files in a file system of Web server 12. HTML document 40 incorporates the images 42 using HTML tags that specify the location of files or other Internet resources.

Accordingly, to access a Web page, a Web page request is entered by the user specifying a Uniform Resource Locator ("URL") via Web browser 15 on Web client 14. The user can send a URL over the WWW by "clicking" with a mouse on a Web page link, or the user can enter the entire URL address manually into Web browser 15. When user at Web client 14 sends a URL from Web client 14 this URL is sent and travels across the WWW (over communications network 16), contacting Web server 12 as specified in the URL. Specifically, Web client 14 makes a TCP/IP request (i.e. the URL is sent to Web server 12 using HTTP) to Web server 12. The URL provided by the application refers to HTML document 40 stored on Web server 12.

Web server 12 responds by locating the requested HTML document 40 and returning it to the browser on Web client 14. Web browser 15 receives HTML document 40, interprets the HTML codes, translates them into a Web page (i.e. a document formatted according to HTML), and displays the Web page on Web client 14. In order to display HTML document 40, the browser control makes a request to the hypertext viewer (not shown) to create an instance of a document viewer. This document viewer has a programming interface (specifically a document object interface) through which Web browser 15 manages the display of the document in the designated frame (not shown). In response to requests from Web browser 15, the hypertext viewer parses and renders the HTML code and displays HTML document 40 and related graphical content within the frame.

Figure 3:
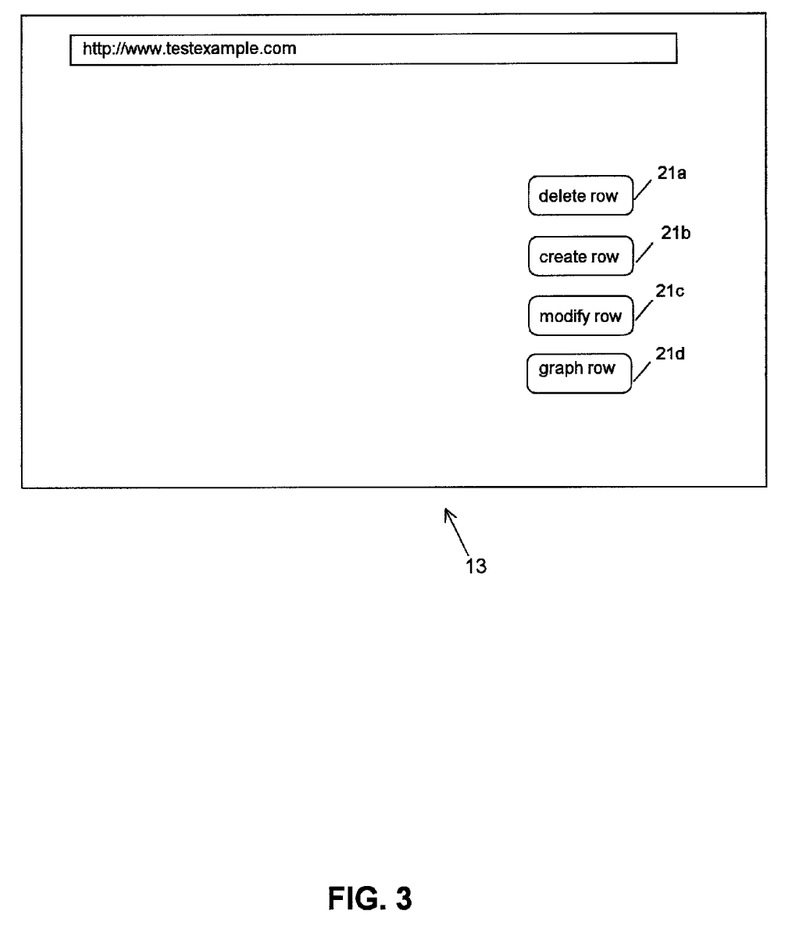
FIG. 3 is a screen capture of a Web browser displaying an HTML document generated by the Web server of FIG. 2 that provides the user with access to a number of application programs installed on the Web server of FIG. 2.

FIG. 3 is a screen capture of a typical user interface to Web browser 15, shown generally as 13. User interface 13 generated on Web client 14 provides the user with access to a number of application programs installed on Web server 12 through the use of HTML form elements 21*a*,21*b*,21*c* and 21*d*. A user will normally employ Web browser 15 to browse all the data content (i.e. HTML document 40) received from a URL request made to the WWW.

Now referring to FIGS. 2 and 3, an administrator of Web server 12 is typically provided with a bundle of server application programs for installation on the Web server 12. These server application programs can then be offered to Web clients 14 over the WWW. The Web server administrator is also given a standard Web server program (e.g. a Java program) which generates a HTML document that includes HTML form elements (e.g. buttons) for display by Web client 14 and which allow users to access the server application programs. In a case where a Web server administrator only installs a subset of the bundle of application programs on Web server 12, certain application programs are not available for execution by Web client 14 and the corresponding HTML form elements should not be displayed to the user.

For illustrative purposes, consider the situation where a number of server application programs, namely DELETE ROW, CREATE ROW, MODIFY ROW and GRAPH ROW are installed on Web server 12. As shown in FIG. 3, the associated HTML form elements 21*a*,21*b*,21*c* and 21*d* are displayed by user interface 13. Specifically, the delete row application program is displayed as the DELETE ROW button 21*a*, the create row application program is displayed as the CREATE ROW button 21*b*, the modify row application program is displayed as a MODIFY ROW button 21*c*, and a graph row application program is displayed as a GRAPH ROW button 21*d*. The user can execute any one of these server application programs by simply selecting the appropriate HTML form element (e.g. button).

In a case where the graph row server application program is not installed on Web server 12, the HTML form element (i.e. the GRAPH ROW button) should not be shown to the user since it is not available for execution. If it is in fact shown to the user, then it's display by Web browser 15 would only cause confusion and detract from the overall effectiveness of the graphical user interface. It should be understood that the HTML form element could be any type of form element (e.g. pull down menu element, scrolling listing, etc.), and that a button element is utilized in the present discussion for illustrative purposes only.

Figure 4:
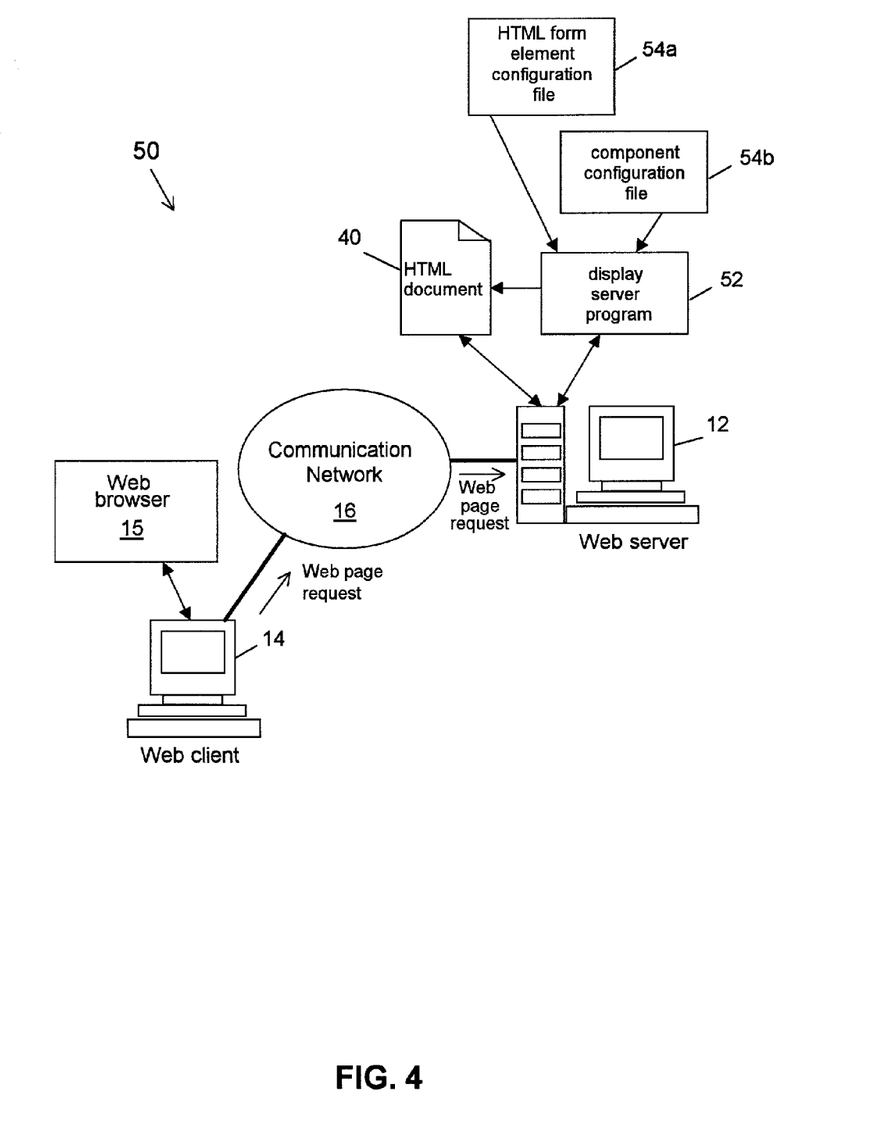
FIG. 4 is a schematic diagram of a computer system according to a preferred embodiment of the present invention that includes a display server program and configuration files installed on a Web server.

Referring now to FIG. 4, a computer system 50 is shown within which the dynamic display of HTML form element can be accomplished in accordance with a preferred embodiment of the invention. A display server program 52 installed on Web server 12 is used to generate HTML document 40 for processing by Web browser 15 at Web client 14. A HTML form element configuration file 54*a* and a component configuration file 54*b* are parsed by display server program 52 at run time.

HTML form element configuration file 54*a* contains descriptions of the HTML form elements and their associated component (i.e. the server application program that they represent). Component configuration file 54*b* contains the installation status (i.e. installed or uninstalled) for the server application programs at issue. The present invention has been implemented within IBM's Websphere™ Commerce Suite Version 5.1 and provides for the dynamic display of HTML form element by associating the installation status of a particular server application program with a corresponding HTML form element.

Display server program 52 can be implemented within any type of software programming language which is capable of generating an HTML document (e.g. Sun Microsystem's JavaServer Pages™ technology ("JSP"), Microsoft's Active Server Page™ language ("ASP"), C++ language, etc.) For illustrative purposes, it will be assumed that display server program 52 is written as a JSP program. JSP programs typically contain XML-like tags and scriptlets written in the Java programming language to encapsulate the logic that generates the content for the page.

HTML form element and component configuration files 54*a* and 54*b* can be implemented within any type of markup language (e.g. HTML, XML, etc.) However, for illustrative purposes, it will be assumed that they are written in XML. As discussed, HTML form element configuration file 54*a* contains descriptions of the HTML form elements and Component configuration file 54*b* contains the installation status (i.e. installed or uninstalled) for the server application programs at issue.

As will be explained, the method of the present invention allows for a Web server administrator to generate a current HTML document that reflects the installation status of the various server application programs by appropriately modifying the HTML form element and component configuration files 54*a* and 54*b* when a server application program is either installed or de-installed. This action can either be accomplished by manually installing a new configuration file or using automatic meaning such as an appropriate server system utility.

The HTML form element configuration file 54*a* contains a data structure which describes the specific HTML form elements that are used by computer system 50 for display. A HTML form element (e.g. button) is defined as having a name attribute (i.e. button name) and an associated component (i.e. the associated server application program), as illustrated by the following example XML pseudocode:

```
\\name = the name of the button
\\component = the component associated with the button
\\action = the action to perform when the button is pressed
<action>
    <button name = "sampleButtonName"
            component = "sampleComponent"
            action = "sampleButtonAction2()"/>
</action>
```

The component configuration file 54*b* contains a data structure which describes the specific components (i.e. server application programs) that may or may not be installed on Web server 12. A component element is defined as having a name attribute (i.e. application program name) and an enabled attribute (i.e. with value "true" if installed and "false" if not installed), as illustrated by the following example XML psuedocode:

```
\\name = the name of the component
\\enabled = true/false depending on whether the component
is enabled or not
<components>
    <component name = "sampleComponent"
               enabled = "true"/>
</components>
```

Figure 5A:
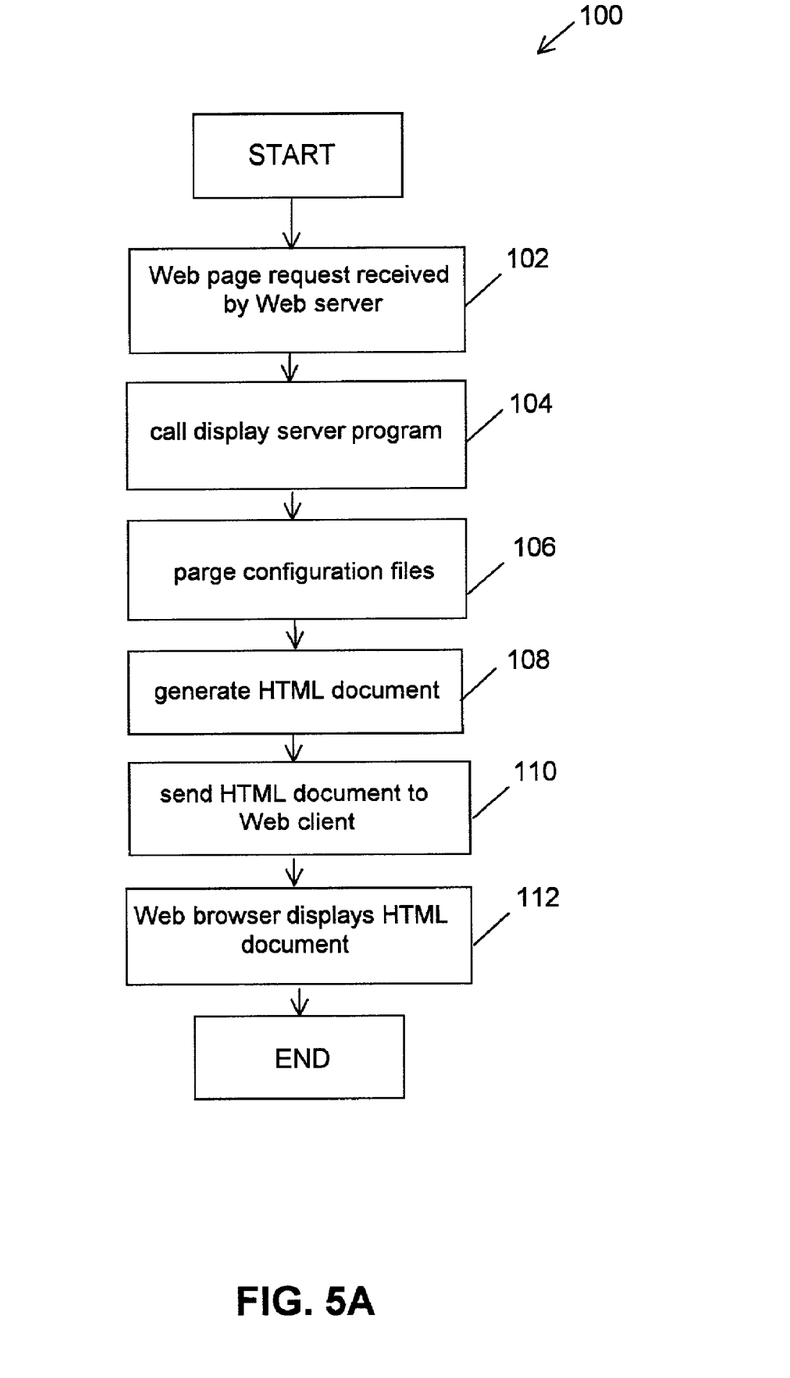
FIGS. 5A and 5B are flowchart diagrams illustrating a preferred method of the present invention for utilizing the display server program and the configuration files of FIG. 4 for selectively displaying an HTML form element on a Web page.
Figure 5B:
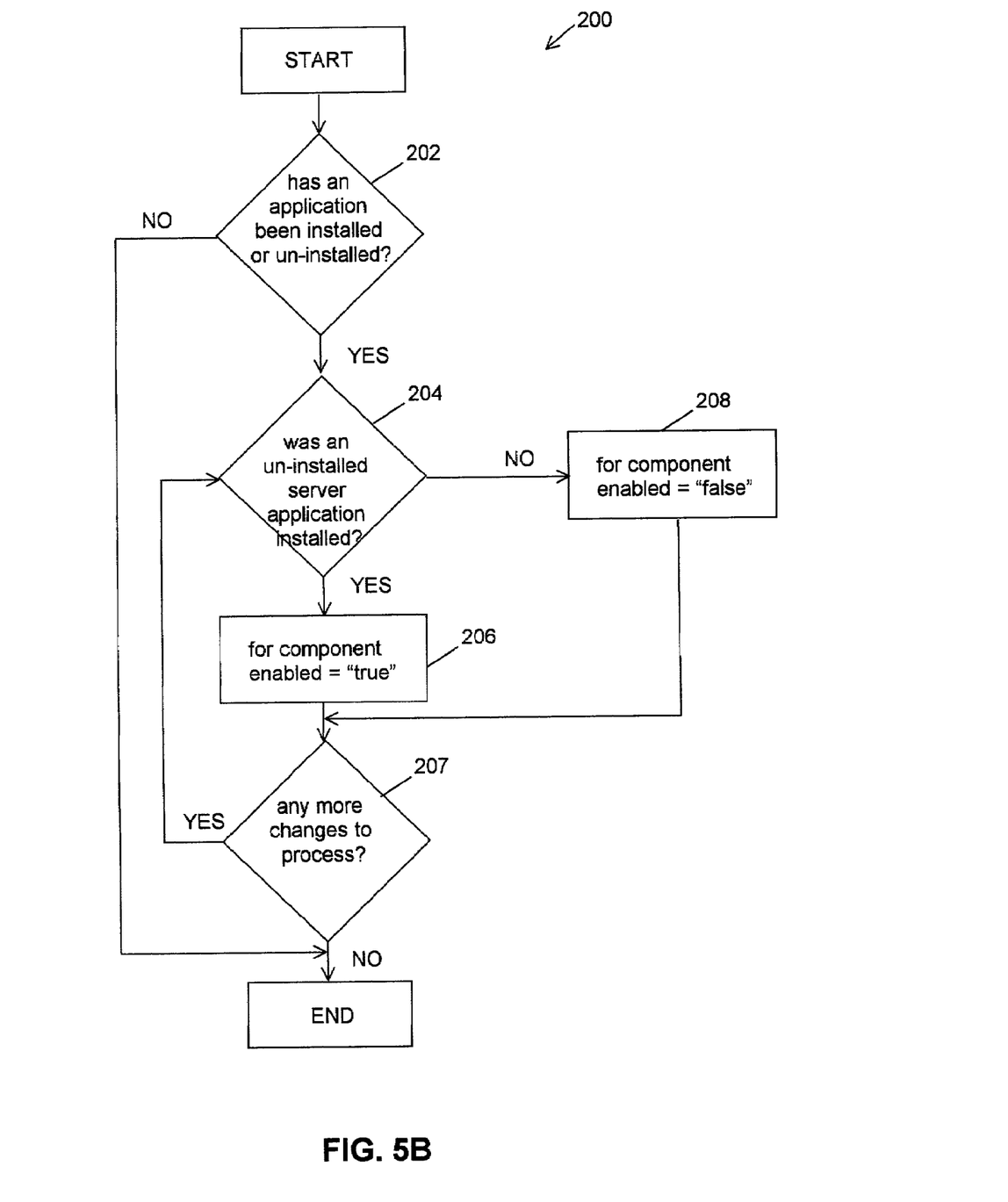

The operation of the computer system 50 shown in FIG. 4 will now be described in relation to high level operational process steps as illustrated in FIGS. 5A and 5B, which are executed by processes residing on Web server 12 and Web client 14 of computer system 50. These applications associate data that represents whether server application programs are installed or not on Web server 12 with corresponding HTML form elements and generate the appropriate HTML document 40 to reflect which server application programs are installed on Web server 12.

Referring first to FIGS. 4 and 5A, the overall process steps 100 that are executed by Web server 12 and Web client 14 of computer system 50 are described.

At step 102, Web server 12 determines whether a Web page request has been received from Web client 14. If a user at Web client 14 has sent a URL from Web client 14 to contacting Web server 12, then at step 104, display application program 52 is executed (i.e. the JSP is compiled into servlets and run). At step 106, display application program 52 at run time parses HTML form element and component configuration files 54a and 54b. At step 108, display application program 52 then generates a new HTML document 40 which will reflect the status of the components as recorded in HTML form element and component configuration files 54a and 54b. Finally, at step 110, in response to the user Web page request, Web server 12 sends the newly generated HTML document 40 to Web client 14. At step 112, Web browser 15 installed on Web client 14 reads and displays HTML document 40 to the user.

Referring now to FIGS. 4 and 5B, the general process steps 200 that are executed by Web server 12 of computer system 50 to maintain current HTML form element and component configuration files 54a and 54b in an automated fashion are described. Process steps 200 are executed in response to a time schedule-based system (i.e. a check every 5 minutes) or which can be executed in response to a "maintenance checking" event (i.e. the system is programmed to "wake up" and check whenever a new application software is installed or de-installed).

At step 202, Web server 12 determines whether a server application program has either been recently installed or un-installed. That is, whether an installed server application program has been un-installed or an un-installed server application program has been installed. If not, then the process ends. If so, then step 204 is executed. At step 204, it is determined whether an un-installed server application program has recently been installed on Web server 12. If so, then at step 206, the enabled attribute of the XML component element is assigned the value "true". If not, then at step 208, the enabled attribute of the XML component element is assigned the value "false". At step 207, Web server 12 determines whether there are any more changes to process (i.e. any more installations or un-installations). If so, then step 204 is executed. If not, then the process ends.

Figure 6A:
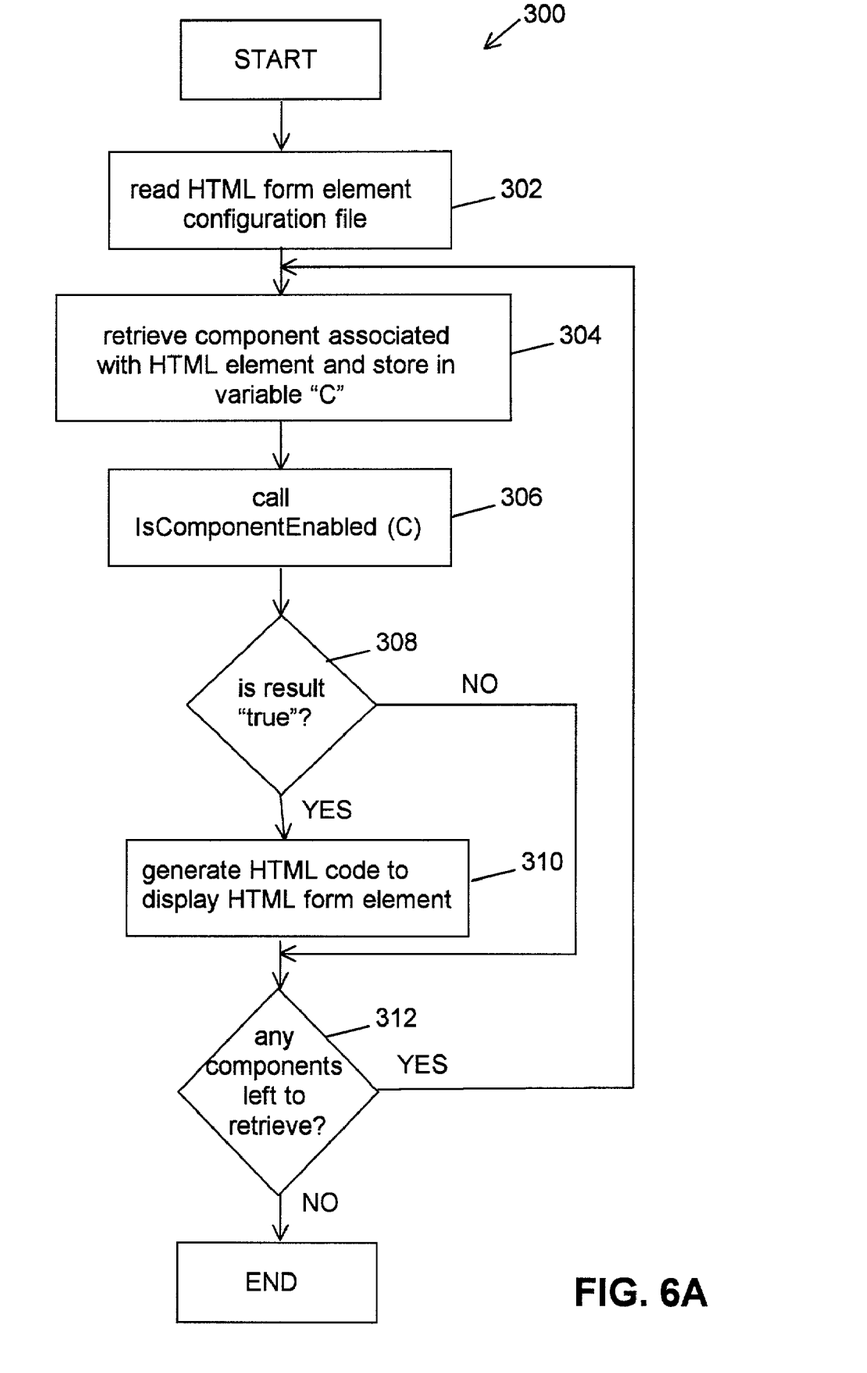
FIGS. 6A and 6B are flowchart diagrams illustrating the process steps of the display server program of FIG. 4 that generates the HTML document for display on a Web page at the Web client.
Figure 6B:
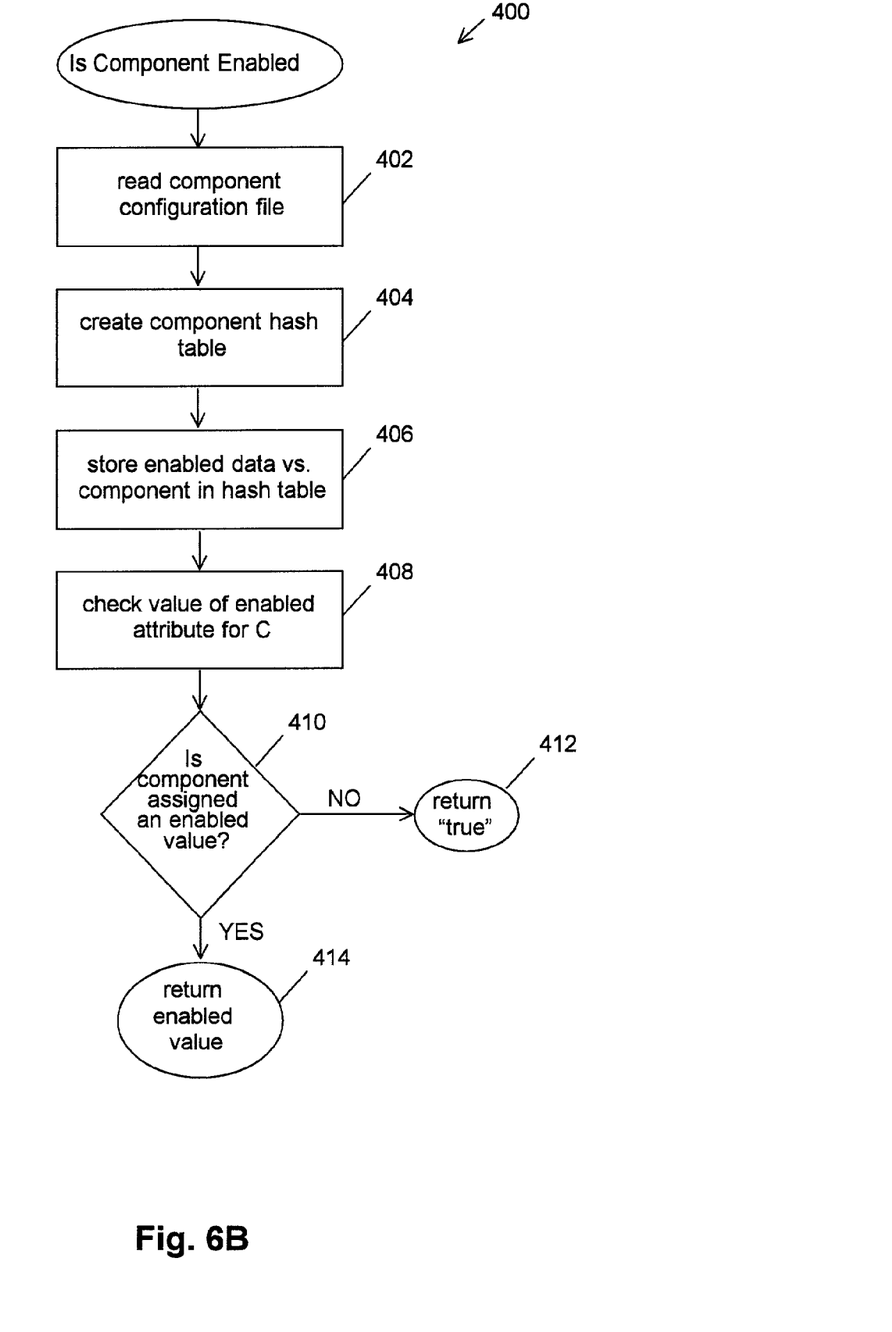

FIGS. 6A and 6B illustrate the general process steps executed by display server program 52 in conjunction with the data structures provided by HTML form element configuration file 54a and component configuration file 54b, as discussed above.

Referring first to FIG. 6A, the overall process steps 300 which are executed by display server program 52 are shown. Specifically, at step 302, the display server program 52 reads the HTML form element configuration file 54a. At step 304, the component associated with the HTML form element is retrieved and stored in a temporary variable "C". At step 306, the IsComponentEnabled routine is executed in order to determine whether the component associated with the HTML form element is enabled or disabled.

At step 308, if the result is "true" then the corresponding HTML code is generated within HTML document 40 for display by Web browser 15. If not, then nothing is included within the HTML document 40 in respect of that HTML form element. At step 312, it is determined whether there are any components left to retrieve. If not, then the process ends. If so, them steps 304, 306, 308 (and possibly 310) are repeated. In this way, all HTML form elements that are listed within the HTML form element configuration file 54a are retrieved and the entablement status of the associated component checked.

Referring now to FIG. 6B, the process steps 400 which are executed by the IsComponentEnabled subroutine of display server program 52 are shown. As discussed above, the IsComponentEnabled subroutine is called at step 306 from within the overall process 300 (FIG. 6A), evaluates whether the component which is associated with a HTML form element at issue is enabled for display, and returns either a "true" or "false" boolean value.

Specifically, at step 402, display server program 52 reads the component configuration file 54b. At step 404, display server program 52 creates a component hash table within which to store component data. At step 406, the value of the name and enabled attributes of the component element are hashed and stored within the hash table. At step 408, for each component element, the value of the enabled attribute is checked and evaluated (at step 410). If the value of the enabled attribute is "true" then "true" is returned (at step 412). If the value of the enabled attribute is "false" then "false" is returned (at step 414). It should be noted that in the case where a component has not been defined, the component will not have been assigned an enabled valve and the result "true" will be returned. This ensures that if a Web server administrator inadvertently forgets to define a component, the associated HTML form element will still be displayed by default.

For illustrative purposes, an implementation of display server program 52 is provided below in JSP pseudocode. Specifically, the following illustrates how the IsComponentEnabled routine would be implemented:

```
// this part of the JSP program defines the isComponentEnabled element
* Determines if the component comp is enabled or disabled
* These components are defined in XML and either enabled or disabled
//
public static boolean isComponentEnabled(String comp)
{
    Hashtable components = new Hashtable();
// Pseudo Code start
Load XML file which defines the components and whether they are enabled or disabled
    Put XML data into components Hashtable as name value pairs
        name = 'Name of Component'
        value = 'True or False depending on wether the component is enabled or not'
```

-continued

```
// Pseudo Code end
// retrieve component comp from xml and return true or false
// depending on the value set in xml
    Boolean b = (Boolean)components.get(comp);
        if (b != null)
        {
            return b.booleanValue();
        }
        else
        {
            return true;
        }
}
```

The following is an example excerpt, EXAMPLE 1, of the HTML form element configuration file 54a that is read by the display server program of FIG. 4 when generating a HTML document for display on a Web page at the Web client (implemented in XML code).

EXAMPLE 1

Sample HTML Form Element Configuration XML File

```
<action>
    <button name="DELETE ROW" component="delete row"/>
    <button name="CREATE ROW" component="create row"/>
    <button name="MODIFY ROW" component="modify row"/>
    <button name="GRAPH ROW" component="graph row"/>
</action>
```

As shown, the HTML form element configuration file 54a includes an XML description of the HTML form elements (e.g. the various buttons) namely, the value pair of the button name attribute and the associated component attribute. As discussed in respect of the process flowchart of FIG. 6A, HTML form element configuration file 54a is used by display server program 52 to identify the set of HTML form elements (e.g. display buttons). For each HTML form element, display server program 52 determines whether the associated component element is enabled.

The following is an example excerpt, EXAMPLE 2, of the component configuration file that is read by the display server program of FIG. 4 when generating a HTML document for display on a Web page at the Web client (implemented in XML code).

EXAMPLE 2

Sample Component Configuration XML File

```
<components>
    <component name="delete row"
        enabled="true"/>
    <component name="create row"
        enabled="true"/>
    <component name="modify row"
        enabled="true"/>
    <component name="graph row"
        enabled="false"/>
</components>
```

As shown, the component configuration file 54b includes an XML description of the component elements, namely, the value pair of the component name attribute and enabled attributes. As discussed in respect of the process flowchart of FIG. 6B, component configuration file 54b is used by display server program 52 to check the installation status (i.e. by checking the value of the enabled attribute) of component elements (i.e. the various server application programs) associated with the various HTML form elements as prescribed by the HTML form element configuration file 54a, discussed above.

Finally, the HTML code that would be generated by the display server program 52 when executed with the HTML form element configuration file 54a and the component configuration file 54b of EXAMPLE 1 and EXAMPLE 2, would cause only the DELETE ROW, the CREATE ROW and the MODIFY ROW buttons to appear on user interface 13 (FIG. 3) on Web client 14. Since the value of the enabled attribute of the "graph row" component element was false (i.e. the server application program for graphing data is not installed on Web server 12), HTML code is not generated for the associated HTML form element (i.e. HTML code for the "GRAPH ROW" button is not generated and included within HTML document 40).

Accordingly, computer system 50 of FIG. 4 and the associated method described in FIGS. 5A, 5B, 6A, and 6B allows for the selective display of an HTML form element on a Web page at Web client 14 depending on whether an associated server application program is installed on Web server 12. In this way, the present invention provides a Web server manager with a easy to use Web page maintenance tool which ensures that the HTML form elements that are displayed on the Web page correlate directly with the server application programs that are installed on Web server 12.

While the present invention has been described in respect of the situation where a server application program has a 1:1 relationship with a HTML form element, it is contemplated that a server application program could be associated with a number of HTML form elements or conversely a HTML form element could be associated with a number of server application programs. These associations could be implemented within the inventive system and method in a straight forward manner by adding additional entries within the HTML form element and the component configuration files 54a and 54b to establish the additional associations. Display server program 52 could be slightly amended so that it recognizes and processes multiple entries within the HTML form element and the component configuration files 54a and 54b.

It is also contemplated that instead of merely showing or hiding HTML form elements within HTML document 40 it would be possible to offer Web server managers the option of merely "disabling" the HTML form element by using the "disable" attribute of some HTML tags (e.g. the disable attribute of the <button> tag). That is, the technique of associating HTML form elements with server application programs and maintaining HTML form element and component (i.e. server application program installation data) in configuration files can be utilized to generate a HTML document that has a "disable" HTML form element. The result would be a Web page screen that displays a disabled HTML form element (e.g. a shaded button) when the server application program is not available for execution. While the display of disabled HTML form elements when the associated application is not available has been known to cause user confusion and detract from the overall effectiveness of the user interface, this approach may be desirable in some contexts.

Although the present invention has been described as disabling or enabling functionality based upon application programs, one skilled in the art will recognize that any object available to Web server 12 maybe dealt with in a similar manner. For example, an MPEG or WAV file that may or may not be installed. By installed, we mean available to the Web server 12, not necessarily resident on the Web server 12. It is not the intent of the inventors to restrict the present invention to the recognition of installed application programs only.

It should be understood that various modifications can be made to the preferred and alternative embodiments described and illustrated herein, without departing from the present invention, the scope of which is defined in the appended claims.

The invention claimed is:

1. A method of selectively displaying a markup language form element on a Web page when an object is available to a Web server, the method comprising the steps of:
    (a) associating the markup language form element with the object;
    (b) reading a configuration file to determine whether the object is available to the Web server;
    (c) generating a markup language document that includes the markup language form element if the object is available to the Web server and a disabled markup language form element if the obiect is not available to the Web server; and
    (d) displaying the markup language form element on the Web page if the markup language document contains the markup language form element.

2. The method of claim 1, wherein the markup language is HTML.

3. The method of claim 1, wherein the markup language form element is a button.

4. The method of claim 1, wherein step (b) includes maintaining a record of whether the object is available to the Web server within said configuration file.

5. The method of claim 4, wherein the configuration file is written in XML.

6. The method of claim 1, wherein the object is an application program.

7. The method of claim 1, wherein step (c) further comprises the step of generating a markup language document that does not include the markup language form element if the object is not available to the Web server.

8. A computer readable medium having computer readable code thereon for causing a networked computer to perform all the steps of the method of claim 1.

9. A computer readable medium having computer readable code thereon for causing a computer to perform all the steps of the method as claimed in claim 1.

10. The method of claim 1, wherein said object is a program associated with a suite of programs which may be installed or uninstalled, and said configuration file indicates whether said program is installed.

11. The method of claim 1, further comprising updating said configuration file periodically to determine availability of at least one of the object and other objects.

12. The method of claim 1, wherein step (a) is performed prior to step (d).

13. The method of claim 1, further comprising creating a hash file of data stored in said configuration file for use in determining whether to display the markup language form element.

14. The method of claim 1, wherein if the configuration file does not contain a reference to an object, the element associated with the object will be displayed.

15. A program product stored on a computer readable medium for generating a markup language document for display on a Web page when an object is available to a Web server, said program product comprising:
    (a) means for associating the markup language form element with the object;
    (b) means for reading a configuration file to determine whether the object is available to the Web server;
    (c) means for generating a markup language document that includes the markup language form element if the object is available to the Web server and a disabled markup lanauaae form element if the obiect is not available to the Web server; and
    (d) means for displaying the markup language form element on the Web page if the markup language document contains the markup language form element.

16. The product of claim 15, wherein the markup language is HTML.

17. The product of claim 15, wherein the markup language form element is a button.

18. The product of claim 15, further comprising means for maintaining a record of whether the object is available to the Web server within said configuration file.

19. The product of claim 18, wherein the configuration file is written in XML.

20. The product of claim 15, wherein the object is an application program.

21. The product of claim 15, further comprising means for the step of generating a markup language document that does not include the markup language form element if the object is not available to the Web server.

22. The product of claim 15, wherein said object is a program associated with a suite of programs which may be installed or uninstalled, and said configuration file indicates whether said program is installed.

23. The product of claim 15, further comprising means for updating said configuration file periodically to determine availability of at least one of the object and other objects.

24. The product of claim 15, further comprising means for creating a hash file of data stored in said configuration file for use in determining whether to display the markup language form element.

25. The product of claim 15, wherein if the configuration file does not contain a reference to an object, the element associated with the object will be displayed.

26. The product of claim 15, in combination with a server system, the server system being for implementing operation of said product.

27. The system of claim 15, wherein if the configuration file does not contain a reference to an object, the element associated with the object will be displayed.

28. A computer system for selectively displaying a markup language form element on a Web page when an associated object is available to a Web server, said computer system comprising:
  (a) a server for generating a markup language document, said server comprising:
    (i) storage means for storing a configuration file having a value representing whether the object is available to the Web server;
    (ii) a first processing means coupled to said storage means for:
      (A) determining whether the object is available to the Web server;
      (B) generating a markup language document that includes the markup language form element if the object is available to the Web server and a disabled markup language form element if the obiect is not available to the Web server;
  (b) a communications network coupled to said server; and
  (c) a second processing means coupled to said server through said communications network, said second processing means for reading and displaying the markup language document.

29. The system of claim 28, wherein the markup language is HTML.

30. The system of claim 28, wherein the markup language form element is a button.

31. The system of claim 28, wherein said first processing means further generates a markup language document that does not include the markup language form element if the object is not available to the Web server.

32. The system of claim 28, wherein said object is a program associated with a suite of programs which may be installed or uninstalled, and said configuration file indicates whether said program is installed.

33. The system of claim 28, further comprising means for updating said configuration file periodically to determine availability of at least one of the object and other objects.

34. The system of claim 28, further comprising means for creating a hash file of data stored in said configuration file for use in determining whether to display the markup language form element. displayed.

* * * * *